United States Patent [19]
Mizokami et al.

[11] Patent Number: 4,584,610
[45] Date of Patent: Apr. 22, 1986

[54] ELECTRONIC PHOTOGRAPHING APPARATUS

[75] Inventors: Kazunori Mizokami, Hachioji; Tadashi Kimura, Tokyo; Juro Kikuchi, Hachioji; Akira Tamagawa, Hino; Yutaka Yunoki, Kunitachi; Kazuo Nakamura, Hachioji, all of Japan

[73] Assignee: Olympus Optical Co., Ltd., Tokyo, Japan

[21] Appl. No.: 580,860

[22] Filed: Feb. 16, 1984

[51] Int. Cl.⁴ ............................................... H04N 5/16
[52] U.S. Cl. ..................................... 358/228; 358/169; 358/224
[58] Field of Search ................. 358/228, 224, 225, 55, 358/169, 226, 221, 227, 209, 212, 213, 168, 170, 906, 335; 250/578; 352/141

[56] References Cited
U.S. PATENT DOCUMENTS

| | | | |
|---|---|---|---|
| 3,767,853 | 10/1973 | Bendell et al. | 358/228 |
| 3,790,706 | 2/1974 | Gurala et al. | 358/169 |
| 4,037,254 | 7/1977 | Monahan | 358/228 |
| 4,081,838 | 3/1978 | Wheeler | 358/169 |
| 4,141,040 | 2/1979 | Dischert et al. | 358/160 |
| 4,216,503 | 8/1980 | Wiggins | 358/280 |
| 4,396,951 | 8/1983 | Tanaka | 358/228 |
| 4,456,931 | 6/1984 | Toyoda et al. | 358/335 |
| 4,470,067 | 9/1984 | Mino | 358/174 |
| 4,481,540 | 11/1984 | Bergen | 358/227 |

FOREIGN PATENT DOCUMENTS 58-153464  9/1983  Japan .

Primary Examiner—Gene Z. Rubinson
Assistant Examiner—Robert G. Lev
Attorney, Agent, or Firm—Frishauf, Holtz, Goodman & Woodward

[57] ABSTRACT

An electronic photographing apparatus including a photosensor for converting an optical image, which enters through an objective lens, to an electric signal, and two comparators to which a video signal obtained by signal-processing the electric signal is supplied. Supplied to the comparators, respectively, are a reference voltage slightly lower than the saturation level of the video signal and a reference voltage slightly higher than the black level of the video signal. The comparators convert the video signal to a binary signal according to the reference voltages. The binary signals are supplied to a video signal processing circuit and are converted to a binary video signal. When the binary video signal is supplied to the display of an electric finder, an image which is over- or/and underexposed is displayed on the display. When the binary signal is supplied to an automatic exposure unit, the exposure of the scene is automatically controlled according to the over- or/and underexposure.

14 Claims, 5 Drawing Figures

ELECTRONIC PHOTOGRAPHING APPARATUS

BACKGROUND OF THE INVENTION

The present invention relates to an electronic photographing apparatus and, more particularly, it relates to an electronic photographing apparatus having both an automatic exposure metering function and an automatic exposing function.

The automatic exposure metering unit generally employed in the electronic photographing apparatus or electronic camera functions according to the full-area averaging method, that is it measures the average amount of exposure on the finer screen. Since the exposure on some specific areas of the finder screen can not be measured by the full-area averaging method, some portions of the picture may be under- or overexposed. In short, the exposure of each portion of the finder screen can not be measured two-dimensionally by the full-area averaging method.

SUMMARY OF THE INVENTION

The object of the present invention is therefore to provide an electronic photographing apparatus capable of two-dimensionally discriminating whether the amount of exposure for a view finder image to be photographed is proper or not.

According to the present invention, an optical image entering through the objective lens is converted to an electric signal by means of a photosenser. A video signal obtained by signal-processing the electric signal is supplied to two comparators. Reference voltages having a level slightly lower than the saturation level of the video signal, and a level slightly higher than the black level of the video signal are applied to the comparators, respectively. The comparators convert the video signal to binary signals according to the reference voltages. The binary signals are supplied to a video signal processing circuit to be converted to a binary video signal. When the binary video signal is supplied to the display of the electric finder, an image is displayed according to its overor/and underexposure. When the binary video signal is supplied to an automatic exposure unit, the exposure for a view finder image is automatically controlled according to its over- or/and underexposure.

DETAILED DESCRIPTION OF THE PREFERRED EMBODIMENT

Figure 1:
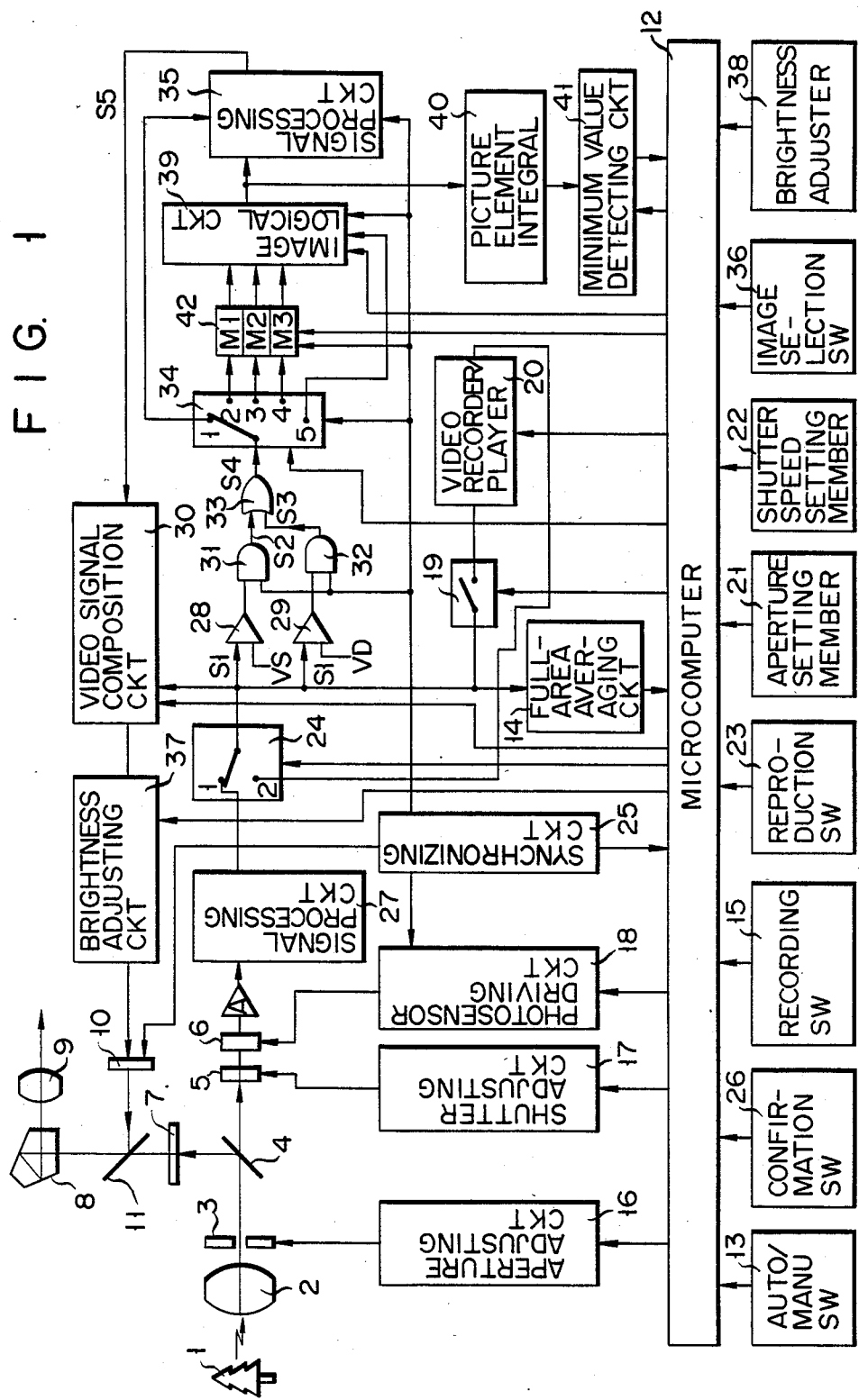
FIG. 1 is a block circuit diagram showing an example of electronic photographing apparatus according to the present invention.

Referring to FIG. 1, the optical image of an object 1 is imaged on a photosensor 6 through an objective lens 2, aperture 3, half mirror 4 and shutter 5. The optical image is also imaged on a finder screen 7 through the half mirror 4. The optical image on the finder screen 7 can be viewed through a half mirror 11, prism 8 and eye-piece lens 9. A display image on a display 10 is projected to the half mirror 11 and can also be viewed through the eyepiece lens 9.

A control device or microcomputer 12 serves to control the whole of an electronic photographing apparatus and has an auto/manual selection switch 13 connected thereto. When the selection switch 13 is set to "auto", the microcomputer 12 achieves automatic exposure photographing. More specifically, in response to the output signal of an external exposure metering circuit (not shown) or a full-area averaging circuit 14, the microcomputer 12 supplies control signals to an aperture control or adjusting circuit 16, shutter speed control or adjusting circuit 17, photosensor driving circuit 18, recording switch 19, and video recording and reproducing section 20 every time the recording switch 15 is operated. When the selection switch 13 is set to "manual", the microcomputer 12 reads the setpoints of the manual aperture and the shutter setting members 21 and 22, determines the aperture and shutter speed and records them every time the recording switch 19 is operated. When a reproduction switch 23 is pushed, a reproduced video signal is read out of the recording and reproducing section 20, and a reproduction switch 24 is changed over from a contact 1 to another contact 2.

Figure 2:
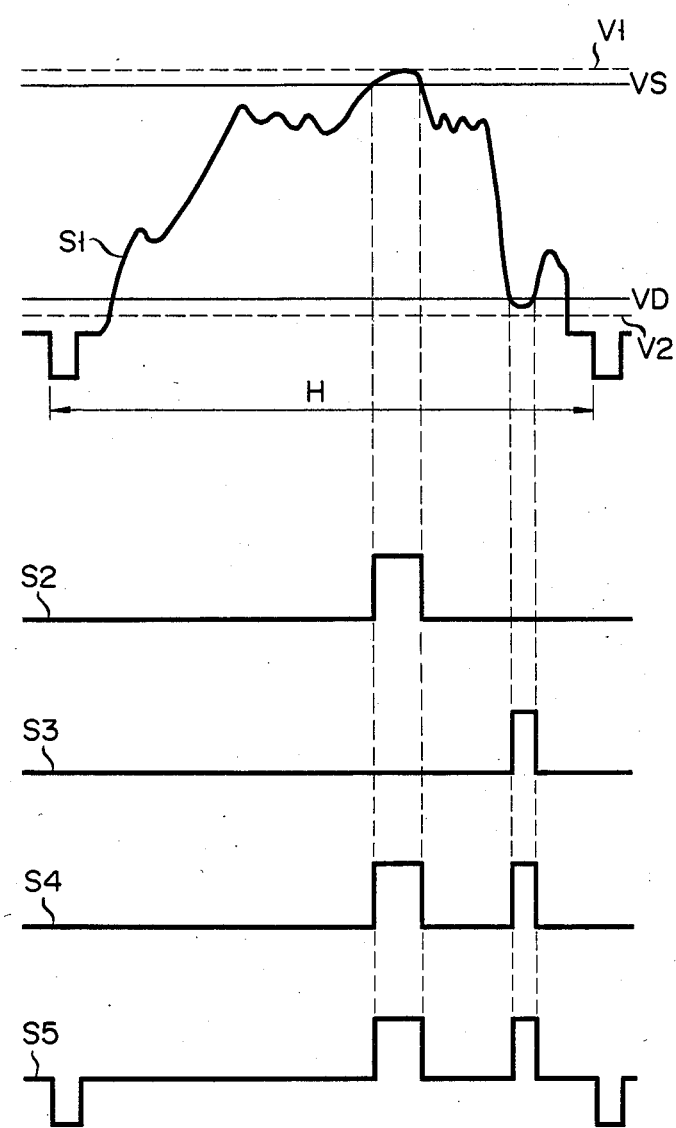
FIG. 2 is a time chart of signals appearing through the circuit shown in FIG. 1.
Figure 3:
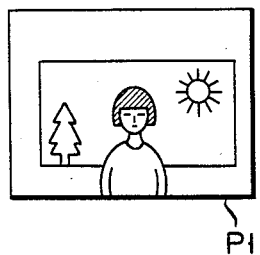
FIG. 3 is an image viewed on the finder screen.
Figure 4:
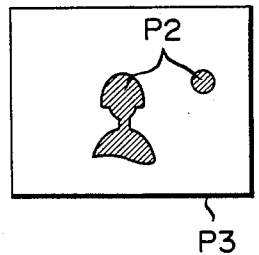
FIG. 4 shows an image displayed on the display of the electric finder.

An image confirmation switch 26 is operated in the case where the image needs only to be confirmed without being recorded. The following operation is carried out when switch 26 is operated. When the switch 26 is pushed, the optical image on the photosensor 6 under manually-set aperture and shutter speed is read out as an electric signal by the photosensor driving circuit 18. The electric signal is amplified by an amplifier A and supplied to a signal processing circuit 27 and converted to an NTSC standard composition video signal. The video signal is applied to comparators 28, 29, a video signal composition circuit 30, and the full-area averaging circuit 14 when the reproduction switch 24 contacts the contact 1. The composition video signal S1 (FIG. 2) supplied to the comparator 28 is converted to a binary signal having logic 1 when it exceeds the white level VS which has been set slightly lower than its saturation level, or to a binary signal having logic 0 when it does not exceed the white level VS. Similarly, the composition video signal supplied to the comparator 29 is converted to logic level 1 when it does not exceed reference value VD which has been set slightly higher than its black level V2, or to the logic level 0 when it exceeds the reference value VD. AND gates 31 and 32 are provided to obtain binary signals S2 and S3 which are formed after removing the retracing signal components from the output signals of the comparators 28 and 29. The binary signals S2 and S3 may be used independently, or they may be applied to an OR gate 33 and converted to a binary signal S4. The binary signal S4 represents a poor quality image signal. The poor quality image signal S4 is supplied to the signal processing circuit 35 to be gain-controlled at a proper value and added with the synchronizing signal extracted from the original video signal. The signal processing circuit 35 produces a binary video signal S5 which represents a poor quality image, when a switch 34 is contacted with contact 1. In the case of the image shown in FIG. 3, that is, a scene in which a person stands beside a window with a strong amount of light, a binary image which represents a poor quality image P2 shown in FIG. 4 is obtained when the image confirmation switch 26 is pushed. According to the binary image, the person who is backlit is underexposed while the sun is overexposed. These objects are represented by the poor quality images P2.

Again, referring to FIG. 1, the binary video signal obtained from the signal processing circuit 35 is supplied to the video signal composition circuit 30 which supplies the binary video signal, output signal or analog video signal of the signal processing circuit 27 to the display 10 according to the selection made by the display image selection switch 36. When both the binary and analog video signals are selected by the display image selection switch 36, the composition signal of both video signals is supplied to the display 10 where a composition image is displayed. A brightness adjusting circuit 37 is connected between the video signal composition circuit 30 and the display 10 to adjust the brightness of the display image. If the display 10 is turned off, an image based on the optical finder can be viewed.

As described above, an over- and/or underexposed binary image is two-dimensionally displayed in the electric finder or diplay 10 every time when the image confirmation switch 26 is pushed, because the analog video signal is converted to a binary video signal according to the white and black reference levels. Therefore, it can be judged reliably and speedily from the displayed binary image whether a picture to be photographed is correctly exposed or not. In this way the photographing apparatus of the present invention can be applied to a specific photographing condition which can not be processed by the full-area averaging circuit. Since the latitude of video is narrower than that of film, the picture quality evaluation achieved by the present invention is useful.

Next will be described a case where a twodimensional picture quality evaluation is applied to automatic exposure. When the continuous mode is set by the image confirmation switch 26, the shutter speed automatically and continuously varies when in the aperture-priority preference, while the aperture automatically and continuously varies when in shutterpriority. A video signal responsive to the changing aperture and shutter speed is supplied to the comparators 28 and 29. Output signals of the comparators 28 and 29 are supplied to the OR gate 33 and output as a poor quality image signal through the OR gate 33. When the switch 34 contacts a contact 5, the poor quality image signal is supplied to an image logical circuit 39, which samples the poor quality image signal, divides it into picture elements, and logically processes them. In the logical process, part of the finder screen or its central portion, for example, is masked and only the poor quality image signal in the important section of the image is processed as an effective signal. When the picture elements are combined in a 2-by-2, or 3-by-3 section and only one or two poor quality elements are present in the section, these poor quality picture elements are ignored. Namely, if a few poor quality picture-elements are in a micro-area, they are made ineffective. Other poor quality picture elements left after the logical process, are measured by a poor quality picture element integrating circuit (or a poor quality picture element counter) 40.

Figure 5:
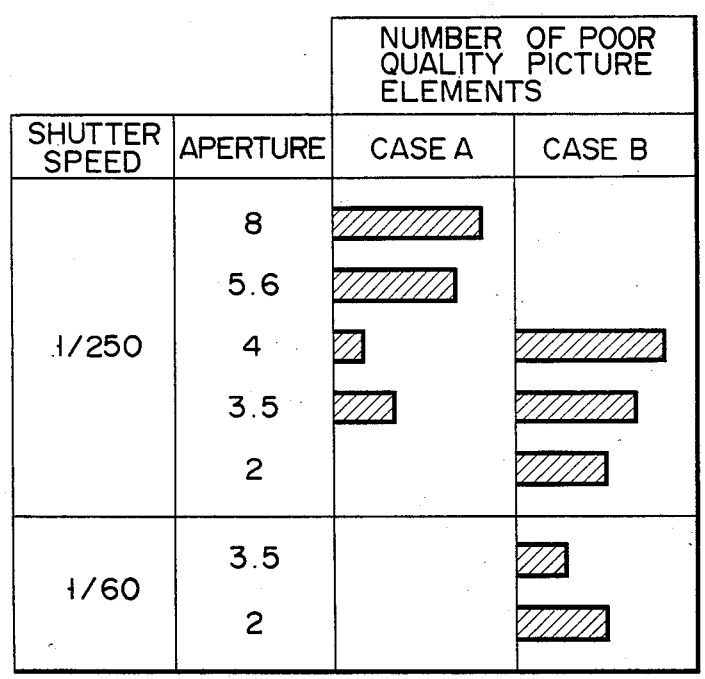
FIG. 5 is a view showing the numeral relationship of poor quality picture elements for apertures and shutter speeds.

The above process can be carried out in taking several different exposures of the same subject. The result obtained is evaluated by a minimum value detecting circuit 41 to calculate the exposure condition under which the number of the poor quality picture elements becomes minimum. Information regarding the exposure of each step is applied from the microcomputer 12 to the minimum value detecting circuit 41. FIG. 5 shows the conditions under which poor quality picture elements are caused in shutterpriority. According to FIG. 5, the best conditions are obtained in case A when the shutter speed is 1/250 sec., while the aperture is 4f. Similarly, in case B, the shutter speed can be 1/60 sec., while the aperture is 3.5f. This can be established in shutter-priority or program automation.

Since the above-described automatic image evaluation or estimation is done electrically, in real time, sixty conditions can be checked every second if the apparatus is operated under the mode which corresponds to the NTSC standard television system. When a mechanical shutter and aperture are employed, the number of conditions which can be checked every second decreases because the operation speeds of the shutter and aperture are limited, but when a physical shutter and aperture which includes no mechanicallyactuating member is employed, it becomes possible to check sixty conditions every second.

In a case where a binary image memory 42 is used in the circuit shown in FIG. 1, the switch is contacted by one of the contacts 2, 3 or 4. It is difficult to determine the conditions when an artificial light source such as the electric flash device should be used. The poor quality image signal which represents the outupt of the OR circuit 33 may be stored in the binary image memory 42. For example, if a poor quality image signal obtained under a specific shutter speed and aperture is stored in an area M1 of the binary image memory 42, other poor quality image signals obtained under other conditions cur with the switch 34 then be stored in areas M2 and M3 of the binary image memory 42. This process is similar to that of the stepping exposure often employed in photography. Here the result is stored in the binary image memory.

Several poor quality image signals are read out of the binary image memory 42 and are transferred to the image logical circuit 39, which applies AND, OR exclusive OR gating or masking to the poor quality image signals, if necessary, to remove noise and the like from these signals in the image logical process. The image logical circuit 39, which has done the image logical process, supplies its output signal to the display 10 via the signal processing circuit 35 to be displayed as a poor quality image. By viewing the image displayed on the display 10, the photographer can judge accurately the latitude of an object on the finder screen at a wide range and can select the optimum photographing condition. If, on the basis of the displayed image information, it is judged that the object to be photographed exceeds the latitude of the video system, the same object can be recorded under plural photographing conditions. According to this system, the capacity of the memory can be reduced because the image signal is stored as a binary signal.

As described above, a video signal is converted to binary video signals responsive to those reference levels which are close to its white and black levels. The binary video signals are then two-dimensionally displayed, as an over- and underexposed image. Therefore, the present invention enables the exposure to be speedily and accurately understood. As a result, the optimum value of the exposure can be determined, and automatic exposure control can be achieved.

Furthermore, the apparatus of this invention eliminates the drawbacks of the prior art image pick-up system, and can perform various photographing functions which have heretofore been impossible in the film camera. According to this invention, the following advantages are obtained:

(1) The apparatus eliminates any ambiguous image which has otherwise been emerged in the conventional photographing apparatus using the full-area averaging method and it is possible to determine an image quality for a two-dimensional image.

(2) The image representing the image quality can be maintained in a one-to-one positional relation to a real image.

(3) It is possible to achieve an automatic operation due partly to the advantage (1) and due partly to the advantage (2).

(4) It is possible to properly set the recording conditions in a recording mode, as well as to evaluate the image which has already been recorded.

(5) It is possible to obtain a one-to-one correspondence between an optical image and an electric image.

(6) The image degradation, for example, which occurs when the FM-recording method and modulation method are used can be adequately checked in the recording operation, preventing the occurrence of any undesired color spots.

(7) It is possible to select either one of an optical finder and an electronic finder.

According to this invention it is possible to obtain finder devices and image evaluation devices applicable to, for example, an image measuring and image processing apparatus using an ITV camera, a video movie system, an electronic process apparatus, a TV camera, a VTR camera or an electronic steel camera.

The operation switches and modes used in the embodiments of this invention may be replaced by another member and mode, respectively, depending upon the use to which they are put. According to this invention it is possible to use various kinds of circuit systems. It is also possible to use, for example, an optical disk, magnetic disk, magnetic tape or an image memory, such as a solid state memory as a recording/reproducing section. The two-dimensional display may be comprised of a liquid crystal display or a light emitting diode display. An optical filter, which can form a properly viewable color contrast, may be provided on the whole surface of the display.

What is claimed is:

1. An electronic photographing apparatus, comprising:
   electronic photographing means for converting an image to be photographed into a video signal including retracing signal components;
   binary coding means for converting the video signal to a binary signal in accordance with the level of the video signal with respect to one of first and second reference levels which are close to saturated white and black levels of the video signal, said binary signal including an image component representing at least one poor quality portion of an image reproduced from said video signal and corresponding to one of overexposure and underexposure;
   signal processing means for converting the binary signal of said binary coding means to a binary video signal; and
   display means for displaying the binary image component representing said poor quality portion of the image which is obtained from the binary video signal of said signal processing means as a two-dimensional optical image.

2. An electronic photographing apparatus according to claim 1, wherein said electronic photographing means comprises a photosensor for converting the image to an electric signal, optical means for imaging the image to said photosensor, and signal processing means for signal-processing and converting the electric signal of said photosensor to the video signal.

3. An electronic photographing apparatus according to claim 1, wherein said binary coding means comprises a first comparator for comparing the video signal with the first reference level having been set slightly lower than the saturation level of the video signal to obtain a first binary signal relative to the first reference level, a second comparator for comparing the video signal with the second reference level having been set slightly higher than the black level of the video signal to obtain a second binary signal relative to the second reference level, and means for removing the retracing signal components of the video signal from the first and second binary signals of said first and second comparators.

4. An electronic photographing apparatus according to claim 3, wherein said binary coding means includes means for composing the first and second binary signals from which the retracing signal components have been removed.

5. An electronic photographing apparatus according to claim 1, further including means for selectively supplying said binary video signal issued from said signal processing means, said video signal issued from said electronic photographing means or a composition signal to said display means, said composition signal being obtained by composing said binary video signal with said video signal.

6. An electronic photographing apparatus according to claim 1, further including memory means for storing said binary video signal representing a poor quality portion of an image reproduced from said video signal and wherein said display means is electronic display means for displaying a video signal from the memory means.

7. An electronic photographing apparatus according to claim 1, further including a plurality of memory means for storing binary video signals representing a poor quality portion of an image reproduced from said video signal and corresponding to said white and said black level and means for simultaneously reading the binary video signals from said memory means and for combining the readout binary video signals into a composite video signal and wherein said display means is means for displaying the composite video signal of said combining means as a composite image.

8. An electronic photographing apparatus according to claim 1, further including means for adjusting brightness and means for stopping the function of said brightness adjusting means.

9. An electronic photographing apparatus according to claim 1, wherein said display means is a liquid cyrstal display.

10. An electronic photographing apparatus according to claim 1, wherein said display means is a light emitting diode display.

11. An electronic photographing apparatus according to claim 1, wherein said display means has an optical filter which forms a properly viewable color contrast.

12. An electronic photographing apparatus, comprising:

electronic photographing means for converting an image to be photographed to a video signal including retracing signal components;

binary coding means for converting the video signal to a binary signal in accordance with the level of said video signal with respect to one of first and second reference levels which are close to saturated white and black levels of the video signal, respectively, said binary signal including an image component representing at least one poor quality portion of an image reproduced from said video signal and corresponding to one of overexposure and underexposure; and means for automatically adjusting the exposure responsive to the binary signal of said binary coding means.

13. An electronic photographing apparatus according to claim 12, wherein said electronic photographing means comprises a photosensor for converting the image to an electric signal, optical means for imaging the object to said photosensor, and signal processing means for signal-processing and converting the electric signal of said photosensor to the video signal, and wherein said automatic exposure adjusting means comprises means arranged at said optical means and intended to control the amount of light of said image on said photosensor.

14. An electronic photographing apparatus according to claim 12, wherein said binary coding means comprises a first comparator for comparing the video signal with the first reference level having been set slightly lower than the saturation level of the video signal to obtain a first binary signal relative to the first reference level, a second comparator for comparing the video signal with the second reference level having been set slightly higher than the black level of the video signal to obtain a second binary signal relative to the second reference level, and means for removing retracing signal components of the video signal from the first and second binary signals of said first and second comparators.

* * * * *

UNITED STATES PATENT AND TRADEMARK OFFICE
CERTIFICATE OF CORRECTION

PATENT NO. : 4,584,610
DATED : April 22, 1986
INVENTOR(S) : Kazunori MIZOKAMI et al It is certified that error appears in the above-identified patent and that said Letters Patent is hereby corrected as shown below:

Column 4, line 33, change "cur" to --can--.

Signed and Sealed this

Eleventh Day of November, 1986

Attest:

DONALD J. QUIGG

Attesting Officer  Commissioner of Patents and Trademarks